United States Patent
Kuo

(10) Patent No.: US 8,886,006 B2
(45) Date of Patent: Nov. 11, 2014

(54) PROTECTION CAP ASSEMBLY FOR PROTECTING OPTICAL FIBER CONNECTOR ASSEMBLY

(71) Applicant: Hon Hai Precision Industry Co., Ltd., New Taipei (TW)

(72) Inventor: Chang-Wei Kuo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/873,185

(22) Filed: Apr. 29, 2013

(65) Prior Publication Data
US 2014/0185999 A1  Jul. 3, 2014

(30) Foreign Application Priority Data
Dec. 28, 2012 (TW) .............................. 101150844 A

(51) Int. Cl.
*G02B 6/00* (2006.01)
*G02B 6/245* (2006.01)

(52) U.S. Cl.
CPC ..................................... *G02B 6/245* (2013.01)

USPC ......................................................... 385/139

(58) Field of Classification Search
USPC ......................................................... 385/139
See application file for complete search history.

(56) References Cited

U.S. PATENT DOCUMENTS

| | | | |
|---|---|---|---|
| 6,439,780 B1 * | 8/2002 | Mudd et al. | 385/83 |
| 8,465,212 B2 * | 6/2013 | Bradley | 385/77 |
| 2006/0245694 A1 * | 11/2006 | Chen et al. | 385/71 |
| 2012/0099821 A1 * | 4/2012 | Lin et al. | 385/74 |

* cited by examiner

*Primary Examiner* — Ryan Lepisto
(74) *Attorney, Agent, or Firm* — Novak Druce Connolly Bove + Quigg LLP

(57) ABSTRACT

The disclosure relates to a protection cap assembly for protecting an optical fiber connector assembly. The optical fiber connector assembly includes a first shell and a second shell. The first shell includes a number of first lenses and the second shell includes a number of second lenses. The protection cap assembly includes a first protection cap and a second protection cap. The first protection cap is configured to sleeve over the first shell to enclose the first lenses. The second protection cap is configured to sleeve over the second shell to enclose the second lenses.

5 Claims, 5 Drawing Sheets

PROTECTION CAP ASSEMBLY FOR PROTECTING OPTICAL FIBER CONNECTOR ASSEMBLY

BACKGROUND

1. Technical Field

The present disclosure relates to a protection cap assembly for protecting an optical fiber connector assembly.

2. Description of Related Art

An optical fiber connector assembly includes two mating optical fiber connectors. Each optical fiber connector includes a number of coupling lenses, which are typically exposed to contaminants and easily scratched. There, the service life of the optical fiber connector assembly is greatly shortened.

Therefore, it is desirable to provide a protection cap assembly for protecting an optical fiber assembly, which can overcome the limitations described.

DETAILED DESCRIPTION

Embodiments of the disclosure will be described with reference to the drawings.

Figure 1:
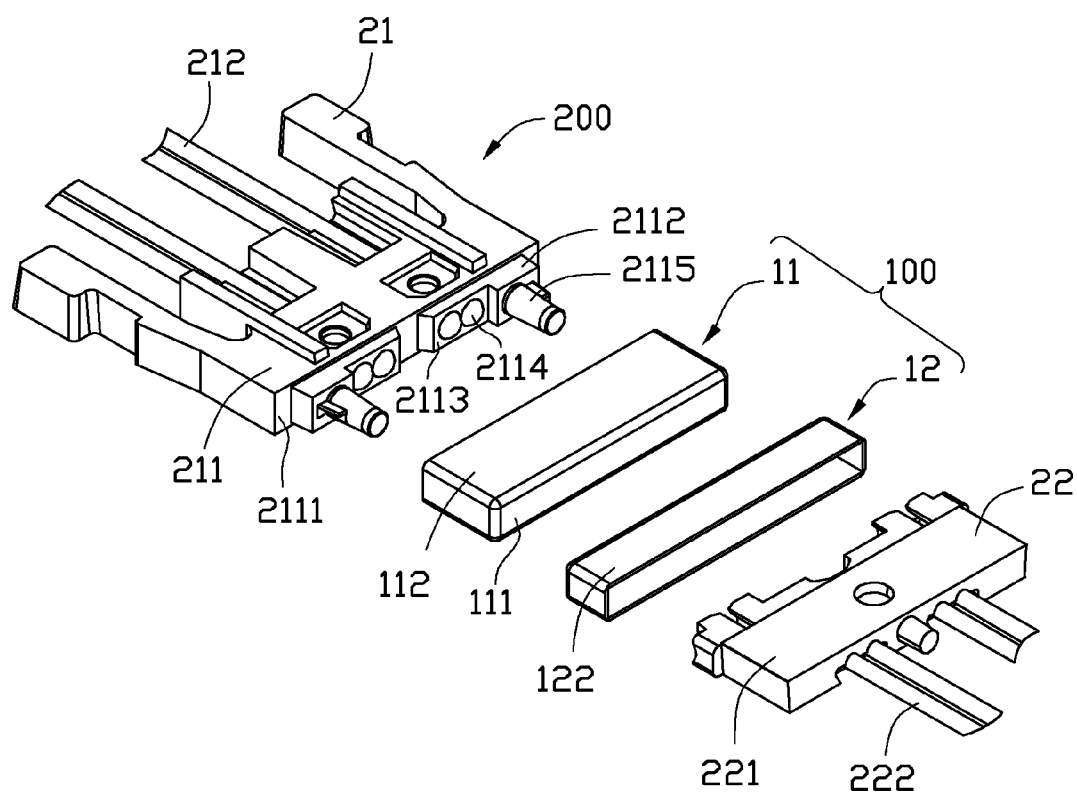
FIG. 1 is an exploded, isometric view of a protection cap assembly for protecting an optical fiber connector assembly, before the protection cap assembly is assembled to the optical fiber connector assembly, in accordance with an exemplary embodiment.
Figure 2:
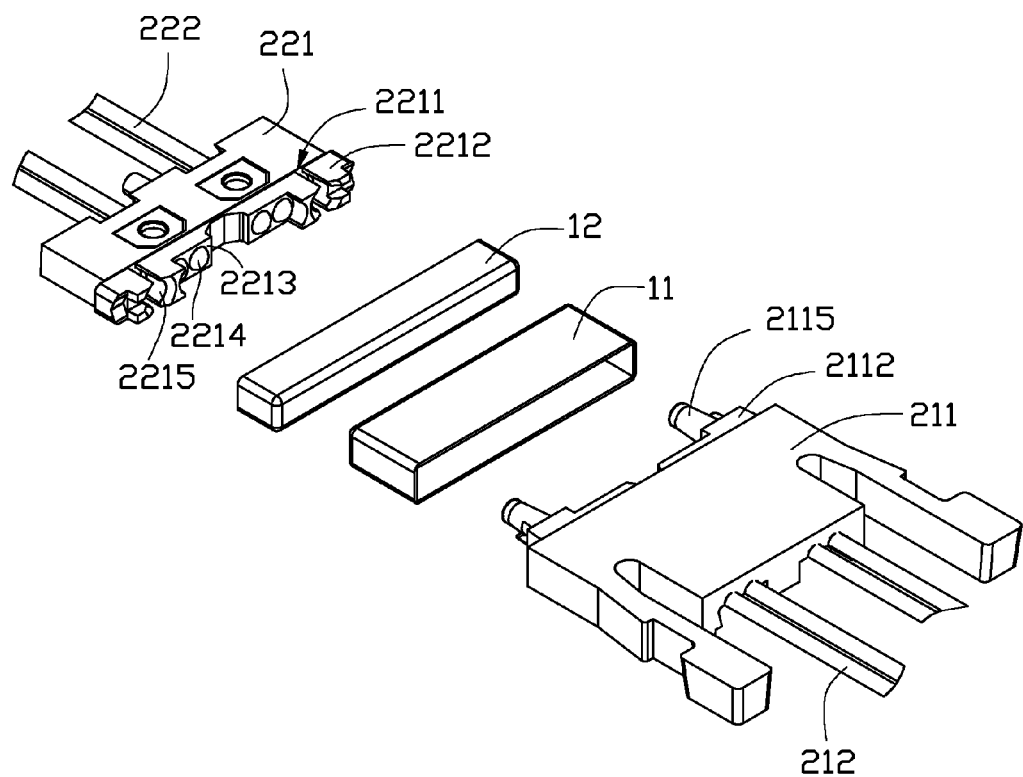
FIG. 2 is similar to FIG. 1, but viewed from another angle.
Figure 3:
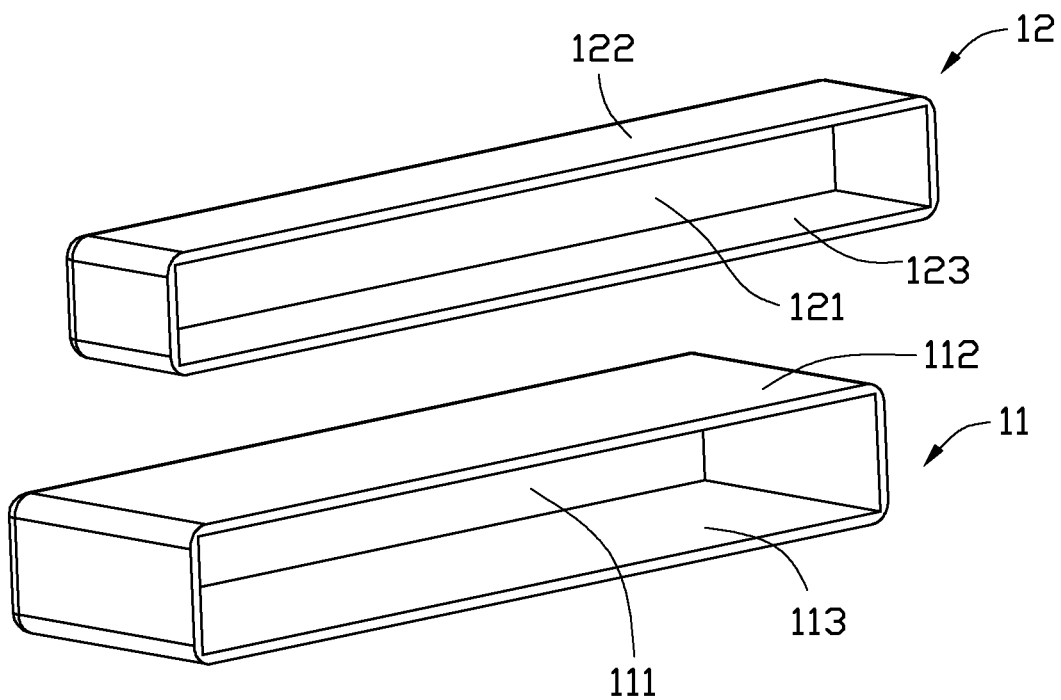
FIG. 3 is an isometric view of the protection cap assembly of FIG. 1.

FIGS. 1 to 3 show a protection cap assembly 100 for protecting an optical fiber connector assembly 200 in accordance with an exemplary embodiment. The protection cap assembly 100 includes a first protection cap 11 and a second protection cap 12.

The optical fiber connector assembly 200 includes a first optical fiber connector 21 and a second optical fiber connector 22. The first optical fiber connector 21 includes a substantially cubic first shell 211 and four first fibers 212. The first shell 211 is made of plastic or resin and is transparent. The first shell 211 includes a substantially rectangular first side surface 2111. Two first protrusions 2112 extend from the first side surface 2111. The first protrusions 2112 are spaced from each other and each first protrusion 2112 includes a first matching surface 2113 parallel to the first side surface 2111. Two first lenses 2114 extend from each first matching surface 2113. Four first lenses 2114 of the two first matching surfaces 2113 are arranged in a line. Each first lens 2114 is a convex lens. An alignment post 2115 extends from each first protrusion 2112 and is perpendicular to the first side surface 2111. The four first lenses 2114 are positioned between two alignment posts 2115 of the two first protrusions 2112. Each first fiber 212 is partially received in the first shell 21 and is aligned with a respective first lens 2115. A contour of the first protrusions 2112 is substantially a rectangle.

The second optical fiber connector 22 includes a substantially cubic second shell 221 and four second fibers 222. The second shell 221 is also made of plastic or resin and is transparent. The second shell 221 includes a substantially rectangular second side surface 2211. Two second protrusions 2212 extend from the second side surface 2211. The second protrusions 2212 are spaced from each other and each second protrusion 2212 includes a second matching surface 2213 parallel to the second side surface 2211. Two second lenses 2214 extend from each second matching surface 2213. Four second lenses 2214 of the two second matching surface 2213 are arranged in a line. Each second lens 2214 is a convex lens. Each second protrusion 2212 defines an alignment hole 2215 extending perpendicularly to the second side surface 2211. The four second lenses 2214 are positioned between two alignment holes 2215 of the two second protrusions 2212. Each alignment hole 2215 corresponds to an alignment post 2115. Each second fiber 222 is partially received in the second shell 22 and is aligned with a respective second lens 2215. A contour of the second protrusions 2212 is substantially a rectangle.

The first protection cap 11 is made of elastic material such as plastic or rubber. In the embodiment, the first protection cap 11 is made of rubber. The first protection cap 11 is substantially a hollow cube and includes a first bottom plate 111 and four first sidewalls 112. The first bottom plate 111 is rectangular in shape, which corresponds to the contour of the first protrusions 2112. The four first sidewalls 112 extend from four sides of the first bottom plate 111. The four first sidewalls 112 are sequentially connected to each other. The first bottom plate 111 and the four first sidewalls 112 cooperatively define a first receiving space 113 for receiving the first protrusions 2112.

The second protection cap 12 is made of elastic material such as plastic or rubber. In the embodiment, the second protection cap 12 is made of rubber. The second protection cap 12 is substantially a hollow cube and includes a second bottom plate 121 and four second sidewalls 122. The second bottom plate 121 is rectangular in shape, which corresponds to the contour of the second protrusions 2212. The four second sidewalls 122 extend from four sides of the second bottom plate 121. The four second sidewalls 122 are sequentially connected to each other. The second bottom plate 121 and the four second sidewalls 122 cooperatively define a second receiving space 123 for receiving the second protrusions 2212.

Figure 4:
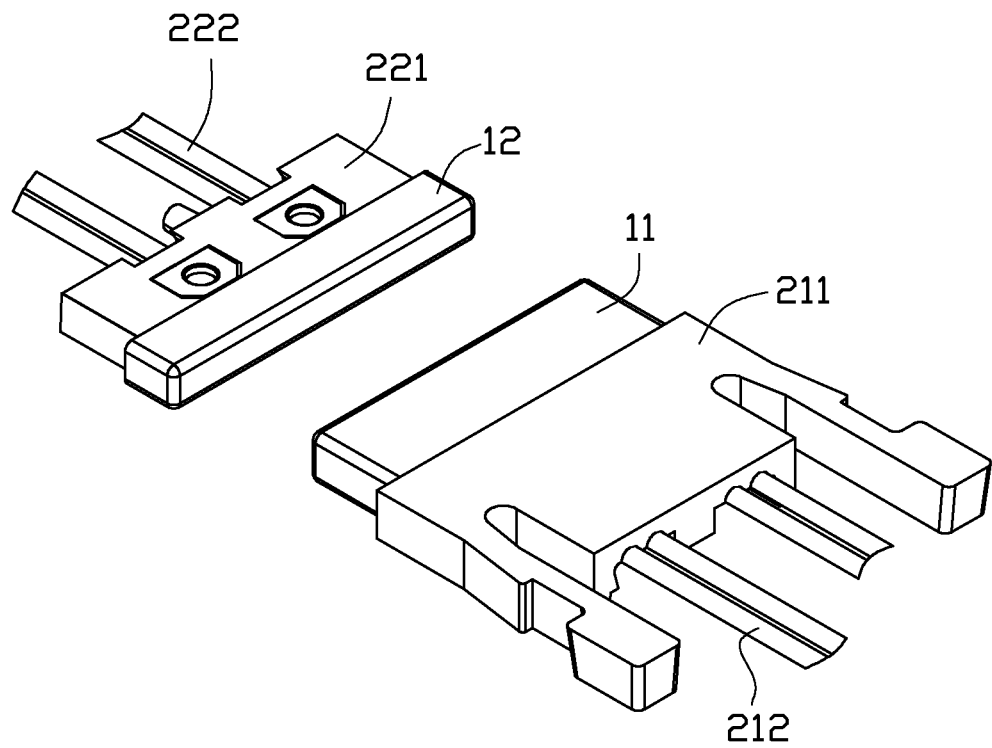
FIG. 4 is an assembled isometric view of the protection cap assembly for protecting the optical fiber assembly of FIG. 1, when the protection cap assembly is assembled to the optical fiber connector assembly.

FIGS. 2 and 4 show that when the protection cap assembly 100 is not in use, the first protection cap 11 is compactly sleeved on the first protrusions 2112 with the first protrusions 2112 being received in the first receiving space 113. Therefore, the first lenses 2114 are received in the first receiving space 113 and are enclosed in the first protection cap 11 to prevent contamination and damage. The second protection cap 12 is compactly sleeved over the second protrusions 2212 with the second protrusions 2212 received in the second receiving space 123. Therefore, the second lenses 2214 are received in the second receiving space 123 and enclosed in the second protection cap 12 to prevent contamination and damage.

Figure 5:
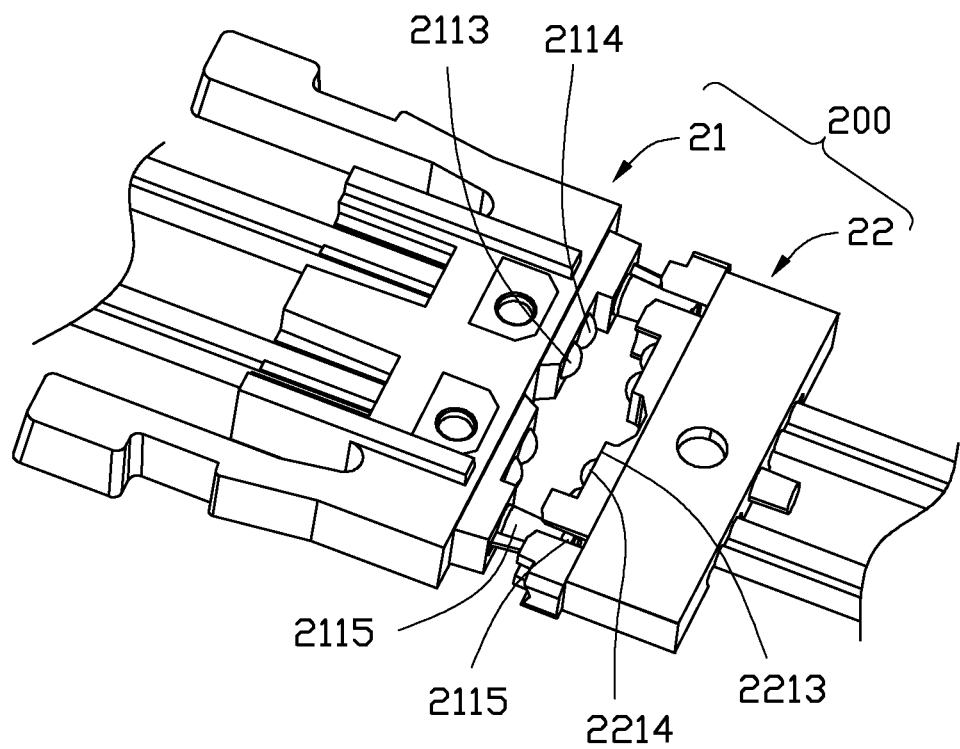
FIG. 5 is an assembled isometric view of the optical fiber connector assembly.

FIGS. 4 and 5 show that when the optical fiber assembly 100 is in use. The first protection cap 11 is removed from the first protrusions 2112 and the second protection cap 12 is moved from the second protrusions 2212. Each alignment post 2115 is inserted into a respective alignment hole 2215. Each first lens 2114 faces and is aligned with a respective second lens 2214 to achieve signal transmission between the first optical fiber connector 21 and the second optical fiber connector 22.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A protection cap assembly for protecting an optical fiber connector assembly, the optical fiber connector assembly comprising a first shell and a second shell, the first shell comprising a first side surface, two first protrusions extending from the first side surface and being spaced from each other, and a number of first lenses, each first protrusion comprising a first matching surface parallel to the first side surface, two first lenses extending up from the first matching surface, the second shell comprising a number of second lenses; and the protection cap assembly comprising:

a first protection cap comprising a first bottom plate and four first sidewalls extending from four peripheral sides of the first bottom plate, the first bottom plate and the four first sidewalls cooperatively defining a first receiving space, the first protection cap engaging with the two first protrusions to be assembled with the first shell and to enclose the first lenses and the two first protrusions in the first receiving space; and a second protection cap configured to sleeve over the second shell to enclose the second lenses.

2. The protection cap assembly of claim 1, wherein the first protection cap is a hollow cuboid; the first bottom plate is rectangular, and the four first sidewalls are connected to each other end-to-end.

3. The protection cap assembly of claim 1, wherein the second shell comprises a second side surface and two second protrusions extending from the second side surface and being spaced from each other, each protrusion comprises a second matching surface parallel to the second side surface; two second lenses extend up from the second matching surface; the second protection cap is sleeved over the second protrusions.

4. The protection cap assembly of claim 3, wherein the second protection cap is a hollow cube and comprises a second bottom plate and four second sidewalls; the second bottom plate is rectangular, the four second sidewalls extend from four peripheral sides of the second bottom plate, the four second sidewalls are connected to each other end-to-end, the second bottom plate and the four second sidewalls cooperatively define a second receiving space, the second protection cap engages with the two second protrusions to be assembled with the first shell and to enclose the second lenses and the two second protrusions in the second receiving space.

5. The protection cap assembly of claim 1, wherein the first protection cap and the second protection cap are made of rubber.

* * * * *